United States Patent
Shimada et al.

(10) Patent No.: US 9,952,562 B2
(45) Date of Patent: Apr. 24, 2018

(54) TIMING SIGNAL GENERATING DEVICE, ELECTRONIC APPARATUS, MOVING OBJECT, METHOD OF GENERATING TIMING SIGNALS, AND METHOD OF CONTROLLING SATELLITE SIGNAL RECEIVER

(71) Applicant: Seiko Epson Corporation, Tokyo (JP)

(72) Inventors: Hiroyuki Shimada, Suwa (JP); Yoshiyuki Maki, Suwa (JP); Noriaki Tanaka, Chino (JP)

(73) Assignee: Seiko Epson Corporation (JP)

( * ) Notice: Subject to any disclaimer, the term of this patent is extended or adjusted under 35 U.S.C. 154(b) by 812 days.

(21) Appl. No.: 14/153,463

(22) Filed: Jan. 13, 2014

(65) Prior Publication Data

US 2014/0203963 A1    Jul. 24, 2014

(30) Foreign Application Priority Data

Jan. 18, 2013    (JP) .................................. 2013-006994

(51) Int. Cl.
*G04R 40/02*    (2013.01)
*G04F 5/14*    (2006.01)

(52) U.S. Cl.
CPC .............. *G04R 40/02* (2013.01); *G04F 5/145* (2013.01)

(58) Field of Classification Search
USPC .................................................. 342/357.58
See application file for complete search history.

(56) References Cited

U.S. PATENT DOCUMENTS

| 4,468,793 | A | * | 8/1984 | Johnson ................. | G01S 19/32 |
| | | | | | 342/357.27 |
| 4,797,677 | A | | 1/1989 | MacDoran et al. | |
| 4,894,662 | A | | 1/1990 | Counselman | |
| 5,317,514 | A | | 5/1994 | Bancroft et al. | |
| 5,323,163 | A | * | 6/1994 | Maki ..................... | G01S 19/426 |
| | | | | | 342/357.48 |
| 5,412,389 | A | * | 5/1995 | Olds ...................... | G01C 21/00 |
| | | | | | 342/357.21 |
| 5,517,430 | A | | 5/1996 | Lewis | |
| 5,631,838 | A | * | 5/1997 | Ishikawa ................ | G01S 19/20 |
| | | | | | 342/357.58 |
| 5,798,733 | A | * | 8/1998 | Ethridge ................ | G01C 21/20 |
| | | | | | 342/357.34 |

(Continued)

FOREIGN PATENT DOCUMENTS

| JP | 08-313613 | 11/1996 |
| JP | 09-178870 | 7/1997 |

(Continued)

*Primary Examiner* — Chuong P Nguyen
(74) *Attorney, Agent, or Firm* — Harness, Dickey & Pierce, P.L.C.

(57) ABSTRACT

A timing signal generating device includes a GPS receiver and a processing unit. The GPS receiver functions as a positioning calculation unit, and receives satellite signals transmitted from GPS satellites and performs positioning calculation based on trajectory information and time information contained in the received satellite signals. Further, the processing unit functions as a position information generation unit, and generates position information of a receiving point based on a mode value or a median value in results of the positioning calculation at a plurality of times by the GPS receiver.

8 Claims, 12 Drawing Sheets

(56) References Cited

U.S. PATENT DOCUMENTS

| | | | |
|---|---|---|---|
| 5,808,581 A * | 9/1998 | Braisted | G01S 19/20 |
| | | | 342/357.58 |
| 6,061,018 A * | 5/2000 | Sheynblat | G01S 19/50 |
| | | | 342/357.33 |
| 6,114,988 A * | 9/2000 | Schipper | G01S 19/235 |
| | | | 342/357.58 |
| 6,535,833 B1 | 3/2003 | Syrjarinne | |
| 6,799,116 B2 * | 9/2004 | Robbins | G01S 5/009 |
| | | | 340/991 |
| 7,881,407 B2 | 2/2011 | Chansarkar et al. | |
| 8,046,169 B2 | 10/2011 | Mazlum et al. | |
| 8,358,241 B2 | 1/2013 | Yoshioka | |
| 2004/0203861 A1 | 10/2004 | Sahinoglu | |
| 2005/0093739 A1 * | 5/2005 | DiLellio | G01S 19/08 |
| | | | 342/357.31 |
| 2005/0168382 A1 | 8/2005 | Awata | |
| 2006/0052115 A1 | 3/2006 | Khushu | |
| 2006/0082495 A1 | 4/2006 | Wakamatsu et al. | |
| 2008/0191935 A1 * | 8/2008 | Tidwell | G01S 19/20 |
| | | | 342/357.58 |
| 2008/0273578 A1 | 11/2008 | Brenner et al. | |
| 2009/0002228 A1 | 1/2009 | Wang | |
| 2009/0091495 A1 * | 4/2009 | Meyers | G01S 19/23 |
| | | | 342/357.48 |
| 2010/0079333 A1 * | 4/2010 | Janky | G01S 19/43 |
| | | | 342/357.24 |
| 2010/0217517 A1 | 8/2010 | Oohashi et al. | |
| 2011/0195339 A1 | 8/2011 | Iijima et al. | |
| 2011/0309864 A1 | 12/2011 | Yensen et al. | |
| 2014/0009332 A1 * | 1/2014 | Morrison | G01S 19/11 |
| | | | 342/357.31 |

FOREIGN PATENT DOCUMENTS

| | | |
|---|---|---|
| JP | 2000-314771 A | 11/2000 |
| JP | 2003-149316 A | 5/2003 |
| JP | 2004-163404 A | 6/2004 |
| JP | 2006-010638 A | 1/2006 |
| JP | 2006-112878 A | 4/2006 |
| JP | 2007-114120 A | 5/2007 |
| JP | 2008-107353 A | 5/2008 |
| JP | 2009-008556 A | 1/2009 |
| JP | 2009-222486 A | 10/2009 |
| JP | 2010-139439 A | 6/2010 |
| JP | 2010-197280 A | 9/2010 |
| JP | 2011-080898 A | 4/2011 |
| JP | 2013-036985 A | 2/2013 |

* cited by examiner

|  | LATITUDE (ddmmss.sss) | LONGITUDE (ddmmss.sss) | HEIGHT (ALTITUDE) (m) | DISTANCE FROM REAL POSITION (m) |
|---|---|---|---|---|
| MEAN VALUE | 361032.04 | 1375744.28 | 689.886 | 7.62 |
| MEDIAN VALUE | 361032.12 | 1375744.17 | 687.380 | 3.84 |
| MODE VALUE | 361032.13 | 1375744.17 | 686.955 | 2.98 |
| REAL POSITION | 361032.10 | 1375744.10 | 684.020 | 0 |

FIG. 7A

|  | LATITUDE (ddmmss.sss) | LONGITUDE (ddmmss.sss) | HEIGHT (ALTITUDE) (m) | DISTANCE FROM REAL POSITION (m) |
|---|---|---|---|---|
| MEAN VALUE | 361032.06 | 1375744.68 | 737.70 | 55.60 |
| MEDIAN VALUE | 361032.09 | 1375744.28 | 711.45 | 27.80 |
| MODE VALUE | 361032.15 | 1375744.13 | 690.47 | 6.68 |
| REAL POSITION | 361032.10 | 1375744.10 | 684.02 | 0 |

FIG. 7B

TIMING SIGNAL GENERATING DEVICE, ELECTRONIC APPARATUS, MOVING OBJECT, METHOD OF GENERATING TIMING SIGNALS, AND METHOD OF CONTROLLING SATELLITE SIGNAL RECEIVER

BACKGROUND

1. Technical Field

The present invention relates to a timing signal generating device, an electronic apparatus, a moving object, a method of generating timing signals, and a method of controlling a satellite signal receiver.

2. Related Art

GPS (Global Positioning System) as one of global navigation satellite systems (GNSS) using artificial satellites have been widely known. An extremely high precision atomic clock is mounted on a GPS satellite and transmits satellite signals on which trajectory information, accurate time information of the GPS satellite, etc. are superimposed to the ground. A GPS receiver receives the satellite signals transmitted from the GPS satellites, and performs processing of calculating a current position and a current time based on the trajectory information and the time information superimposed on the satellite signals, processing of generating accurate timing signals in which time is updated every second (1 PPS), etc.

The GPS receiver may be mounted on a moving object and used for knowing the position of the moving object, or may be installed in a location that does not move with respect to the surface of the ground (a building or the like) and used for obtaining accurate timing of 1 PSS (for example, a stock exchange or the like). In the former case, the GPS receiver is necessary to continuously perform calculation of the current position, however, in the latter case, the GPS receiver is not necessary to continuously perform calculation of the current position. Accordingly, a normal positioning mode for continuous positioning calculation and a position fix mode for outputting 1 PPS based on preset position information are generally provided in the GPS receiver.

In the normal positioning mode, satellite signals from a predetermined number (at least three for two-dimensional positioning, four for three-dimensional positioning) of GPS satellites or more are necessary for processing of solving an equation with a plurality of parameters (latitude and longitude for two-dimensional position, latitude, longitude, and altitude for three-dimensional position) for position determination and a time parameter as variables. Further, the larger the number of GPS satellites from which satellite signals can be received, the more improved the precision of positioning calculation. In contrast, in a situation in which the reception environment of satellite signals is too poor for receiving satellite signals from many GPS satellites, precision of position information of positioning results and 1 PPS is deteriorated. On the other hand, in the position fix mode, position information is preset in the GPS receiver, and 1 PPS may be generated only when satellite signals from at least one GPS satellite can be received. Therefore, in the case where the GPS receiver is installed in a location that does not move and accurate 1 PPS is necessary, use in the position fix mode is appropriate.

The precision of 1 PPS in the position fix mode depends on the precision of the set position information, and it is important to set accurate position information in the PGS receiver. As a method of acquiring accurate position information for setting in the GPS receiver, for example, a method of map reading, surveying, etc. are conceivable. However, there are problems that, in the former case, it may be difficult to acquire position information depending on the receiving location and, in the latter case, costs including expense and time may be required.

In order to solve the problems, a method of determining a position of a receiving point by performing positioning calculation using the installed GPS receiver itself and averaging position information of positioning results over a predetermined period has been proposed in Patent Document 1 (JP-A-9-178870), and position information in an arbitrary receiving location may be acquired and the cost may be reduced.

However, in the case where some error such as multipath occurs, position information as a result of positioning calculation contains a significant error. Accordingly, in the method of Patent Document 1 of averaging results of positioning calculation, an error of the position of the receiving point obtained as the averaging result may be significant. On this account, in the method of Patent Document 1, there is a problem that the precision of 1 PPS (timing signal) may be deteriorated depending on the reception environment for positioning calculation. The problem is a common problem not only for the GPS receiver but for receiving devices of other global navigation satellite systems (GLASS).

SUMMARY

An advantage of some aspects of the invention is to provide a timing signal generating device, an electronic apparatus, a moving object, a method of generating timing signals, and a method of controlling a satellite signal receiver that is not subject to the limitation of the receiving location and can generate more accurate timing signals than those in related art while reducing costs.

The invention can be implemented as the following embodiments or application examples.

Application Example 1

A timing signal generating device according to this application example includes a positioning calculation unit that receives satellite signals transmitted from position information satellites and performs positioning calculation based on trajectory information and time information contained in the received satellite signals, a position information generation unit that generates position information of a receiving point based on a mode value or a median value in results of the positioning calculation at a plurality of times by the positioning calculation unit, and a timing signal generation unit that receives the satellite signals transmitted from the position information satellites and generates timing signals in synchronization with a reference time based on the trajectory information contained in the received satellite signals and the position information of the receiving point.

The position information satellite is an artificial satellite that transmits signals containing information usable for calculation of position information of the receiving point, for example, a satellite, a geostationary satellite, a quasi-zenith satellite, or the like used for global navigation satellite systems (GNSS) including GPS, Galileo, and GLONASS.

According to the timing signal generating device of the application example, the timing signals are generated based on the position information of the receiving point based on the mode value or the median value in the results of the positioning calculation at the plurality of times, and thus, even when errors of the positioning calculation become significant due to deterioration of the reception environment, the positioning results with significant errors hardly have an effect, and the more accurate timing signals than those in related art may be generated.

Further, according to the timing signal generating device of the application example, the timing signals may be generated using the position information based on the results of the positioning calculation of itself, and thus, the receiving location may not be limited and the cost may be reduced.

Application Example 2

The timing signal generating device according to the application example may be configured such that the timing signal generating device includes a plurality of the timing signal generation units, and a timing signal selection unit that determines whether or not there is a failure of the plurality of timing signal generation units, and selects the timing signal generated by one of the plurality of timing signal generation units based on determination results.

For example, the timing signal selection unit may select the timing signal generated by the timing signal generation unit determined not to fail among the plurality of timing signals.

According to the timing signal generating device of the application example, if the timing signal generation unit that generates the timing signal being selected fails, switching to the timing signal generated by the other timing signal generation unit receiving the satellite signals at the same receiving point may be performed. Therefore, output of the accurate timing signals may be continued.

Application Example 3

The timing signal generating device according to the application example may be configured such that the timing signal generating device includes a plurality of the positioning calculation units, a plurality of the timing signal generation units, and a timing signal selection unit, wherein a plurality of the positioning calculation units perform the positioning calculation at different receiving points from one another, the position information generation unit generates the position information of the plurality of receiving points, a plurality of the timing signal generation units generate parameter information representing reception statuses of the timing signals and the satellite signals at the different receiving points from one another, and the timing signal selection unit compares precision of the plurality of the timing signals based on the plurality pieces of the parameter information and selects one of the plurality of timing signals based on comparison results.

For example, the timing signal selection unit may select the timing signal with the highest precision among the plurality of timing signals based on the plurality of pieces of parameter information.

"Timing signal precision" may refer to synchronization precision with respect to the reference time (errors in synchronization with the reference time), for example, and "compare precision of a plurality of the timing signals" may refer to checking of a magnitude relation in synchronization precision with a reference signal among the plurality of timing signals.

According to the timing signal generating device of the application example, the high-precision timing signal may be selected among the plurality of timing signals generated by the plurality of timing signal generation units receiving the satellite signals at the different receiving points from one another and output. Therefore, even when the reception environment changes in response to the lapse of time, the output of the accurate timing signals may be continued.

Application Example 4

The timing signal generating device according to the application example may be configured such that the timing signal generating device includes a satellite signal reception unit that can be switched between a first mode in which satellite signals transmitted from position information satellites are received and positioning calculation is performed based on trajectory information and time information contained in the received satellite signals and a second mode in which the satellite signals transmitted from the position information satellites are received and timing signals in synchronization with a reference time are generated based on the trajectory information contained in the received satellite signals and position information of a set receiving point, a position information generation unit that acquires results of the positioning calculation at a plurality of times, and generates position information of the receiving point based on a mode value or a median value in the results of the positioning calculation at the plurality of times, and a reception control unit that sets the position information of the receiving point in the satellite signal reception unit, and switches the satellite signal reception unit from the first mode to the second mode.

According to the timing signal generating device of the application example, the position information of the receiving point to be set in the second mode is generated based on the mode value or the median value in the results of the positioning calculation at the plurality of times in the first mode by the satellite signal reception unit. When the reception environment of the satellite signals is deteriorated, errors of the positioning calculation due to multipath or the like become significant. If the mean value of the positioning results is set as the position information in the second mode as in the method of related art, it is highly likely that the errors are significant. However, the mode value or the median value is set as in the application example and the positioning results with significant errors hardly have an effect, and thereby, the accurate timing signals may be generated compared to the method of related art.

Further, according to the timing signal generating device of the application example, the position information to be set in the second mode is calculated using the positioning results in the first mode, and thereby, the receiving location may not be limited and the cost may be reduced.

Application Example 5

The timing signal generating device according to the application example may be configured such that the timing signal generating device includes an oscillator that outputs clock signals, and a synchronization control unit that synchronizes the clock signals with the timing signals.

According to the timing signal generating device of the application example, the clock signals output by the oscillator are synchronized with the accurate timing signals, and thereby, the clock signals with the higher precision than the precision of the oscillator may be generated.

Application Example 6

An electronic apparatus according to the application example includes one of the timing signal generating devices described above.

Application Example 7

A moving object according to the application example includes one of the timing signal generating devices described above.

Application Example 8

A method of generating timing signals according to the application example includes a positioning calculation step of receiving satellite signals transmitted from position information satellites and performing positioning calculation based on trajectory information and time information contained in the received satellite signals, a position information generation step of generating position information of a receiving point based on a mode value or a median value in results of the positioning calculation at a plurality of times at the positioning calculation step, and a timing signal generation step of receiving the satellite signals transmitted from the position information satellites and generating timing signals in synchronization with a reference time based on the trajectory information contained in the received satellite signals and the position information of the receiving point.

According to the method of generating timing signals of the application example, the timing signals are generated based on the position information of the receiving point based on the mode value or the median value in the results of the positioning calculation at the plurality of times, and thus, even when errors of the positioning calculation become significant due to deterioration of the reception environment, the positioning results with significant errors hardly have an effect, and the more accurate timing signals than those in related art may be generated.

Further, according to the method of generating timing signals of the application example, the timing signals may be generated using the position information based on the results of the positioning calculation, and thus, the receiving location may not be limited and the cost may be reduced.

Application Example 9

A method of controlling a satellite signal receiver according to the application example is a method of controlling a satellite signal receiver that can be switched between a first mode in which satellite signals transmitted from position information satellites are received and positioning calculation is performed based on trajectory information and time information contained in the received satellite signals and a second mode in which the satellite signals transmitted from the position information satellites are received and timing signals in synchronization with a reference time are generated based on the trajectory information contained in the received satellite signals and position information of a set receiving point, including a position information generation step of acquiring results of the positioning calculation at a plurality of times, and generating position information of the receiving point based on a mode value or a median value in the results of the positioning calculation at the plurality of times, and a reception control step of setting the position information of the receiving point in the satellite signal receiver, and switching the satellite signal receiver from the first mode to the second mode.

According to the method of controlling a satellite signal receiver of the application example, the position information of the receiving point to be set in the second mode is generated based on the mode value or the median value in the results of the positioning calculation at the plurality of times in the first mode by the satellite signal receiver. Thus, the positioning results with significant errors hardly have an effect, and the accurate timing signals may be generated compared to the method of related art.

Further, according to the method of controlling a satellite signal receiver of the application example, the position information to be set in the second mode is calculated using the positioning results in the first mode of the satellite signal receiver, and thereby, the receiving location may not be limited and the cost may be reduced.

BRIEF DESCRIPTION OF THE DRAWINGS

The invention will be described with reference to the accompanying drawings, wherein like numbers reference like elements.

FIGS. 7A and 7B show experimental results of positioning calculation precision.

DESCRIPTION OF EXEMPLARY EMBODIMENTS

As below, preferred embodiments of the invention will be explained with reference to the drawings. Note that the embodiments to be explained do not unduly limit the invention described in the appended claims. Further, not all of the configurations to be explained are not necessarily essential component elements of the invention.

1. Timing Signal Generating Device 1-1. First Embodiment

Figure 1:
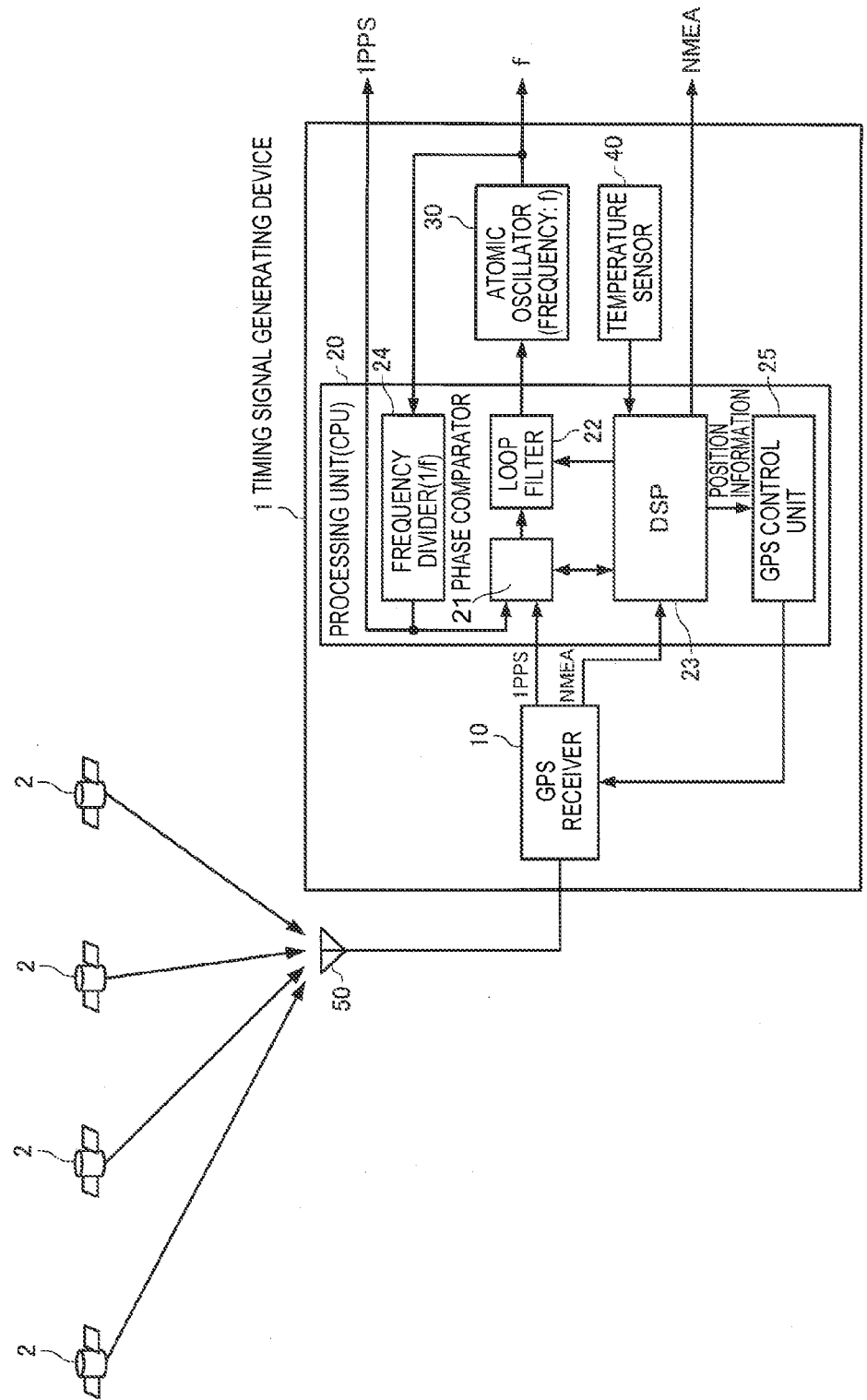
FIG. 1 shows a configuration example of a timing signal generating device of a first embodiment.

FIG. 1 shows a configuration example of a timing signal generating device of a first embodiment. As shown in FIG.

1, a timing signal generating device 1 of the first embodiment includes a GPS receiver 10, a processing unit (CPU) 20, an atomic oscillator 30, a temperature sensor 40, and a GPS antenna 50. Note that the timing signal generating device 1 of the embodiment may have a configuration in which part of these elements is omitted or changed or another element is added. Further, the timing signal generating device 1 of the embodiment may have a configuration in which part or all of the component elements may be physically separated or integrated. For example, the GPS receiver 10 and the processing unit (CPU) 20 may be respectively realized by separate ICs or the GPS receiver 10 and the processing unit (CPU) 20 may be realized as a single-chip IC.

As will be described later in detail, the timing signal generating device of the embodiment receives signals transmitted from a GPS satellite 2 (an example of a position information satellite) and generates high-precision 1 PPS.

The GPS satellite 2 orbits on a predetermined trajectory in the sky above the earth, and transmits satellite signals formed by superimposition of navigation messages on radio wave at 1.57542 GHz (L1 wave) to the ground. Currently, about thirty GPS satellites 2 exist and the respective GPS satellites 2 superimpose 1023-chip (1 ms period) unique patterns called C/A codes (Coarse/Acquisition Codes) on the satellite signals for identification of the GPS satellites 2 sending the satellite signals. The C/A code has the respective chips of "+1" or "−1" and appears as a random pattern. Therefore, the C/A codes superimposed on the satellite signals may be detected by correlation of the satellite signals and the respective C/A code patterns.

The satellite signals transmitted by the respective GPS satellites 2 contain trajectory information representing positions on the trajectories of the respective GPS satellites 2. Further, the respective GPS satellites 2 have atomic clocks and the satellite signals contain extremely accurate time information timed by the atomic clocks. Therefore, the satellite signals from four or more GPS satellites 2 are received and positioning calculation is performed using the trajectory information and the time information contained in the respective satellite signals, and thereby, accurate information of the position and the time of a receiving point (where the GPS antenna 50 is installed) is obtained. Specifically, a four-dimensional equation with the three-dimensional position (x,y,z) of the receiving point and the time t as four variables is created and its solution is obtained.

Further, suppose that the position of the receiving point is known, the satellite signals from one or more GPS satellites 2 are received and the time information of the receiving point is obtained using the time information contained in the respective satellite signals. Furthermore, information of differences between the times of the respective GPS satellites 2 and the time of the receiving point is obtained using the trajectory information contained in the respective satellite signals. Note that slight time errors of the atomic clocks mounted on the respective GPS satellites 2 are measured by a control segment on the ground, the satellite signals contain time correction parameters for correction of the time errors, the time of the receiving point is corrected using the time correction parameters, and thereby, extremely accurate time information is obtained.

Figure 2A:
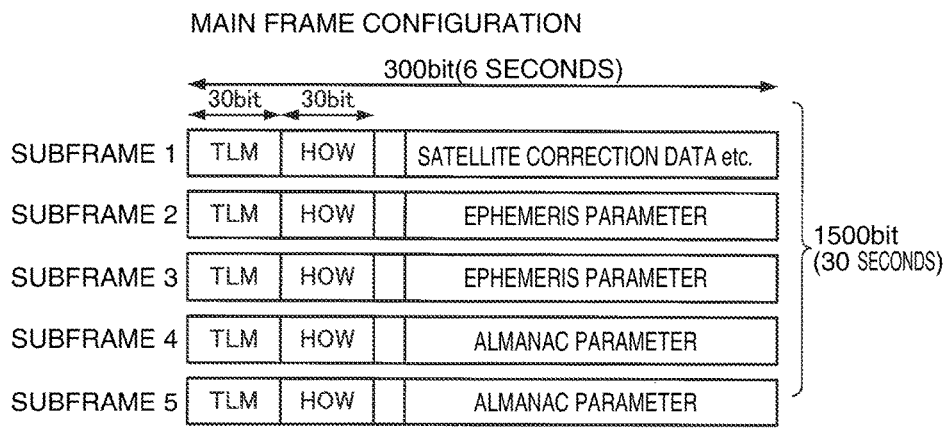
FIGS. 2A to 2C show a configuration of a navigation message.
Figure 2B:
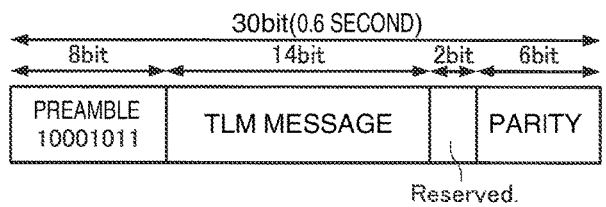
Figure 2C:
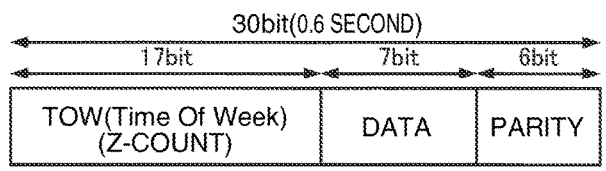

FIGS. 2A to 2C show a configuration of a navigation message. As shown in FIG. 2A, the navigation message is formed as data with a main frame having a total number of bits of 1500 bits as a unit. The main frame is divided into five subframes respectively having 300 bits. The data of one subframe is transmitted in six seconds from the respective GPS satellites 2. Therefore, the data of one main frame is transmitted in thirty seconds from the respective GPS satellites 2.

The subframe 1 contains satellite correction data such as week number data (WN). The week number data is information representing a week including the time of the GPS satellite 2. The start of the time of the GPS satellite 2 is 00:00:00, Jan. 6, 1980, and the week starting from the date has the week number of "0" in UTC (Coordinated Universal Time). The week number data is updated on a weekly basis.

The subframes 2, 3 contain Ephemeris parameters (detailed trajectory information of the respective GPS satellites 2). Further, the subframes 4, 5 contain Almanac parameters (brief trajectory information of all GPS satellites 2).

Furthermore, the subframes 1 to 5 contain TLM (Telemetry) words in which 30-bit TLM (Telemetry word) data is stored and HOW (hand over word) words in which 30-bit HOW (Telemetry word) data is stored from the heads.

Therefore, the TLM words and the HOW words are transmitted from the GPS satellites 2 at intervals of six seconds while the satellite correction data such as week number data, the Ephemeris parameters, the Almanac parameters are transmitted at intervals of thirty seconds.

As shown in FIG. 2B, the TLM word contains preamble data, a TLM message, a Reserved bit, parity data.

As shown in FIG. 2C, the HOW word contains time information of TOW (Time of Week, also referred to as "Z-count"). In the Z-count data, the elapsed time from zero o'clock on every Sunday is indicted in seconds and the time returns to zero at zero o'clock on Sunday at the next week. That is, the Z-count data is information in units of seconds shown from the start of week on a weekly basis, and the elapsed time is a numeric represented in units of 1.5 seconds. Here, the Z-count data represents time information when the first bit of the next subframe is transmitted. For example, the Z-count data of the subframe 1 represents time information when the first bit of the subframe 2 is transmitted. Further, the HOW word contains 3-bit data representing an ID of the subframe (ID code). That is, the HOW words of the subframes 1 to 5 shown in FIG. 2A respectively contain the ID Codes of "001", "010", "011", "100", "101".

The week number data contained in the subframe 1 and the HOW words (Z-count data) contained in the subframes 1 to 5 are acquired, and thereby, the time of the GPS satellite 2 may be calculated. Note that the weak number data is acquired in advance and the elapsed time from the period in which the week number data is acquired is counted inside, and thereby, the current week number data of the GPS satellite 2 may be obtained without acquisition of the weak number data at each time. Therefore, only the Z-count data is acquired, and thereby, the current time of the GPS satellite 2 may be known by approximation.

Returning to FIG. 1, the GPS antenna 50 is an antenna that receives various kinds of radio wave containing satellite signals and connected to the GPS receiver 10. The GPS receiver 10 (an example of a satellite signal reception unit) receives the satellite signals transmitted from the respective GPS satellites 2 via the GPS antenna 50 and performs various kinds of processing. In the embodiment, the GPS receiver 10 has a normal positioning mode (an example of a first mode) and a position fix mode (an example of a second mode), and is set to one of the normal positioning mode and the position fix mode in response to a predetermined control command (control command for mode setting) from processing unit (CPU) 20. The GPS receiver 10 functions as a positioning calculation unit in the normal positioning mode, and receives satellite signals transmitted from the plurality of (preferably, four or more) GPS satellites 2 and performs positioning calculation based on the trajectory information (Ephemeris data, Almanac data, etc.) and the time information (week number data, Z-count data, etc.) contained in the received satellite signals. Further, the GPS receiver 10 functions as a timing signal generation unit in the position fix mode, and receives satellite signals transmitted from at least one of the GPS satellites 2 and generates 1 PPS (1 Pulse Per Second) based on the trajectory information and the time information contained in the received satellite signals and the position information of the set receiving point. The 1 PPS (an example of a timing signal in synchronization with the reference time) is a pulse signal completely synchronized with the UTC (Coordinated Universal Time) and contains one pulse for each second.

Figure 3:
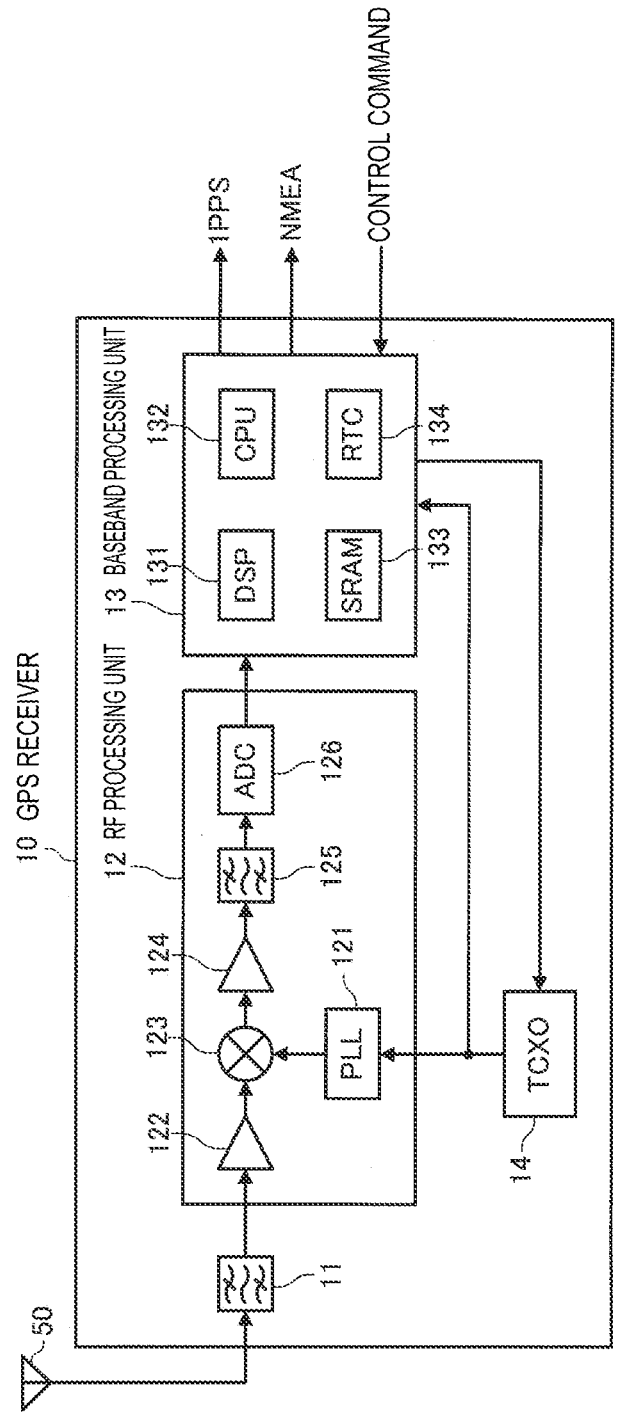
FIG. 3 shows a configuration example of a GPS receiver 10 of the embodiment.

FIG. 3 shows a configuration example of the GPS receiver 10 of the embodiment. The GPS receiver 10 of the embodiment includes a SAW (Surface Acoustic Wave) filter 11, an RF processing unit 12, a baseband processing unit 13, and a temperature compensated crystal oscillator (TCXO) 14. Note that the GPS receiver 10 may have a configuration in which part of these elements is omitted or changed or another element is added.

The SAW filter 11 performs processing of extracting satellite signals from the radio wave received by the GPS antenna 50. That is, the SAW filter 11 is formed as a bandpass filter that passes signals in the 1.5 GHz band.

The RF processing unit 12 includes a PLL (Phase Locked Loop) 121, an LNA (Low Noise Amplifier) 122, a mixer 123, an IF amplifier 124, an IF (Intermediate Frequency) filter 125, and an ADC (A/D converter) 126. Note that the RF processing unit 12 may have a configuration in which part of these elements is omitted or changed or another element is added.

The PLL 121 generates clock signals formed by multiplication of the oscillation signals of the TCXO 14 oscillating at about several tens of megahertz to frequencies in the 1.5 GHz band.

The satellite signals extracted by the SAW filter are amplified by the LNA 122. The satellite signals amplified by the LNA 122 are mixed with the clock signals output by the PLL 121 in the mixer 123 and down-converted to signals in the intermediate frequency band (for example, several megahertz) (IF signals). The signals mixed by the mixer 123 are amplified by the IF amplifier 124.

By the mixing in the mixer 123, high-frequency signals in the order of gigahertz are also generated with the IF signals, and the IF amplifier 124 also amplifies the high-frequency signals with the IF signals. The IF filter 125 passes the IF signals and removes the high-frequency signals (precisely, attenuated to a predetermined level or less). The IF signals that have passed through the IF filter 125 are converted into digital signals by the ADC (A/D converter) 126.

The baseband processing unit 13 includes a DSP (Digital Signal Processor) 131, a CPU (Central Processing Unit) 132, an SRAM (Static Random Access Memory) 133, and an RTC (real time clock) 134, and performs various kinds of processing using the oscillation signals of the TCXO 14 as clock signals.

The DSP 131 and the CPU 132 demodulate the baseband signals from the IF signals, acquire the trajectory information and the time information contained in the navigation messages, and perform processing in the normal positioning mode or processing in the position fix mode in cooperation with each other.

The SRAM 133 is for storage of the acquired time information and trajectory information, the position information of the receiving point set in response to a predetermined control command (control command for position setting), etc. The RTC 134 generates timing for baseband processing. The RTC 134 is counted up by the clock signals from the TCXO 14.

Specifically, the baseband processing unit 13 generates local codes in the same patterns as those of the respective C/A codes and performs processing of correlation between the respective C/A codes and the local codes contained in the baseband signals (satellite search). Then, the baseband processing unit 13 adjusts the generation timing of the local codes so that the correlation values with respect to the respective local codes may achieve peaks and, if the correlation value is equal to or more than a threshold value, determines that the signal is synchronized with the GPS satellite 2 with the local code as the C/A code (the GPS satellite 2 is captured). Note that, in GPS, a CDMA (Code Division Multiple Access) system in which all GPS satellites 2 transmit satellite signals at the same frequency using different C/A codes is employed. Therefore, by discrimination of the C/A codes contained in the received satellite signals, capturable GPS satellites 2 may be searched.

Further, in order to acquire the trajectory information and the time information of the captured GPS satellite 2, the baseband processing unit 13 performs processing of mixing the local code having the same pattern of the C/A code of the GPS satellite 2 and the baseband signal. In the mixed signal, the navigation message containing the trajectory information and the time information of the captured GPS satellite 2 is demodulated. Then, the baseband processing unit 13 performs processing of acquiring the trajectory information and the time information contained in the navigation message and storing them in the SRAM 133.

Furthermore, the baseband processing unit 13 receives a predetermined control command (control command for mode setting) and is set to one of the normal positioning mode and the position fix mode. In the normal positioning mode, the baseband processing unit 13 performs positioning calculation using the trajectory information and the time information of four or more GPS satellites 2 stored in the SRAM 133.

Further, in the position fix mode, the baseband processing unit 13 outputs high-precision 1 PPS using the trajectory information of one or more GPS satellites 2 stored in the SRAM 133 and the position information of the receiving point stored in the SRAM 133. Specifically, the baseband processing unit 13 includes a 1 PPS counter that counts generation timing of the respective pulses of 1 PPS in a part of the RTC 134, calculates propagation delay times required until the satellite signals transmitted from the GPS satellites 2 reach the receiving point using the trajectory information of the GPS satellites 2 and the position information of the receiving point, and changes the set value of the 1 PPS counter to an optimum value based on the propagation delay times.

Note that the baseband processing unit 13 may output 1 PPS based on the time information of the receiving point obtained by positioning calculation in the normal positioning mode and may perform positioning calculation if it is possible to capture the plurality of GPS satellites 2 in the position fix mode.

Further, the baseband processing unit 13 outputs NMEA data containing various kinds of information such as the position information and the time information of the results of the positioning calculation, the reception status (the number of captured GPS satellites 2, strength of satellite signals, or the like), etc.

Returning to FIG. 1, the processing unit (CPU) 20 (an example of a satellite signal reception control device) transmits various kinds of control commands to the GPS receiver 10 to control the operation of the GPS receiver 10, and receives the 1 PPS and the NMEA data output by the GPS receiver 10 and performs various kinds of processing. The processing unit 20 may perform various kinds of processing according to a program stored in an arbitrary memory, for example.

In the embodiment, the processing unit 20 includes a phase comparator 21, a loop filter 22, a DSP (Digital Signal Processor) 23, a frequency divider 24, and a GPS control unit 25.

The DSP 23 (an example of a position information generation unit) performs processing of acquiring the NMEA data at fixed intervals (for example, every second) from the GPS receiver 10, collecting the position information contained in the NMEA data (results of positioning calculation in the normal positioning mode by the GPS receiver 10) to create statistical information in a predetermined time, and generating the position information of the receiving point based on the mode value or the median value thereof. That is, the processing of generating the position information of the receiving point may be performed using a value nearer the mode value or the median value than the mean value of the statistical information. For example, the DSP 23 may use the mode value or the median value of the results of the positioning calculation as the position information of the receiving point without change or use a value slightly nearer the mode value than the mean value or a value slightly nearer the median value than the mean value as the position information of the receiving point.

The GPS control unit 25 (an example of a reception control unit) transmits various control commands to the GPS receiver 10 to control the operation of the GPS receiver 10. In the embodiment, the GPS control unit 25 performs processing of transmitting the control command for mode setting to the GPS receiver 10 and switching the GPS receiver 10 from the normal positioning mode to the position fix mode. Further, the GPS control unit 25 performs processing of transmitting the control command for position setting to the GPS receiver 10 before switching the GPS receiver 10 from the normal positioning mode to the position fix mode, and setting the position information of the receiving point generated by the DSP 23 in the GPS receiver 10.

The frequency divider 24 f-frequency-divides the clock signal (frequency: f) output by the atomic oscillator 30 and outputs a divided clock signal of 1 Hz.

The phase comparator 21 performs phase comparison between the 1 PPS output by the GPS receiver 10 and the divided clock signal of 1 Hz output by the frequency divider 24, and the phase difference signal of the comparison result by the phase comparator 21 is input to the atomic oscillator 30 via the loop filter 22. The parameter of the loop filter 22 is set by the DSP 23.

Note that, in the case where the phase difference is extremely small, equal to or less than resolution of the phase comparator 21, it may be impossible to detect the phase difference, and thus, in the DSP 23, for example, the phase difference equal to or less than the resolution of the phase comparator 21 is extended and the accurate phase difference is detected.

The divided clock signal of 1 Hz output by the frequency divider 24 is synchronized with the 1 PPS output by the GPS receiver 10, and the timing signal generating device 1 outputs the divided clock signal to the outside as 1 PPS with extremely high frequency precision synchronized with UTC. Further, the timing signal generating device 1 outputs the latest NMEA data to the outside every second in synchronization with 1 PPS.

The atomic oscillator 30 is an oscillator that can output clock signals with high frequency precision using energy transition of atoms. For example, atomic oscillators using rubidium atoms and cesium atoms are widely known. As the atomic oscillator 30, for example, atomic oscillators using the EIT (Electromagnetically Induced Transparency) phenomenon (also referred to as CPT (Coherent Population Trapping) phenomenon), atomic oscillators using the optical micro double resonance phenomenon, etc. may be used. The timing signal generating device 1 also outputs clock signals at a frequency of f output by the atomic oscillator 30 to the outside.

The atomic oscillator 30 is adapted to fine-tune the frequency in response to the output voltage (control voltage) of the loop filter 22, and the clock signals output by the atomic oscillator 30 are completely synchronized with the 1 PPS output from the GPS receiver 10 by the phase comparator 21, the loop filter 22, the DSP 23, and the frequency divider 24 as described above. That is, the configuration including the phase comparator 21, the loop filter 22, the DSP 23, and the frequency divider 24 functions as a synchronization control unit that synchronizes the clock signals output by the atomic oscillator 30 with 1 PPS. Note that, since the frequency-temperature characteristics of the atomic oscillator 30 alone are not flat, the temperature sensor 40 is provided near the atomic oscillator 30, and the DSP 23 adjusts the output voltage of the phase comparator 21 in response to the detection value of the temperature sensor 40 (detected temperature) to perform processing of temperature compensation of the frequency-temperature characteristics of the atomic oscillator 30.

Note that, when a situation that the GPS receiver 10 fails to receive satellite signals or the like occurs, the precision of 1 PPS output by the GPS receiver 10 is deteriorated or the GPS receiver 10 stops output of 1 PPS. In this case, the processing unit 20 may stop processing of synchronizing the clock signals output by the atomic oscillator 30 with 1 PPS output by the GPS receiver 10 for self-oscillation of the atomic oscillator 30. In this manner, the timing signal generating device 1 may output 1 PPS with high frequency precision by self-oscillation of the atomic oscillator 30 even when the precision of 1 PPS output by the GPS receiver 10 is deteriorated.

Figure 4:
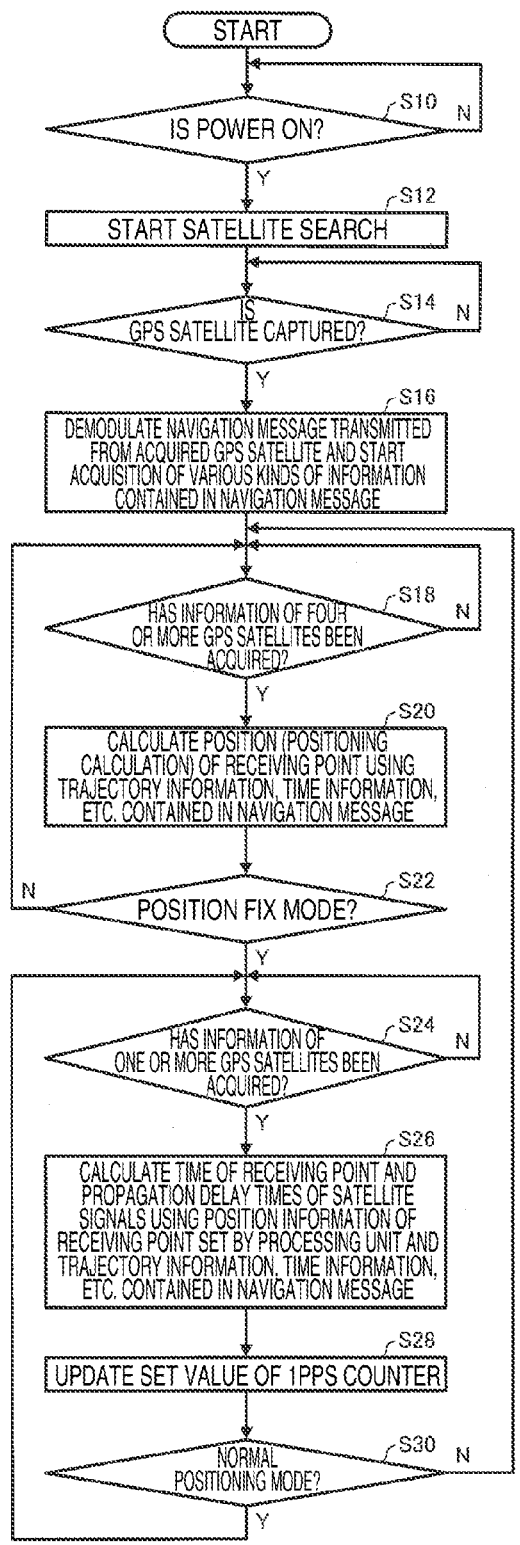
FIG. 4 is a flowchart showing an example of a processing procedure in a normal positioning mode and a position fix mode.

FIG. 4 is a flowchart showing an example of a processing procedure in the normal positioning mode and the position fix mode by the baseband processing unit 13 of the GPS receiver 10.

As shown in FIG. 4, when power is turned on (Y of S10), the baseband processing unit 13 is initialized to the normal positioning mode, and starts to satellite search of searching for the capturable GPS satellites 2 (S12). Specifically, the baseband processing unit 13 demodulates the baseband signals from the IF signals generated by the RF processing unit 12 receiving the satellite signals, and generates local codes having the same patterns of the C/A codes of the respective satellite numbers and calculates correlation values of the C/A codes contained in the baseband signals and the respective local codes. When the C/A code contained in the baseband signal and the local code are the same code, the correlation value has a peak at a predetermined time, however, if they are different codes, the correlation value has no peak and is constantly nearly zero. The baseband processing unit 13 adjusts the generation timing of the local code so that the correlation value of the C/A code contained in the baseband signal and the local code may be the maximum and, if the correlation value is equal or more than a predetermined threshold value, determines that the GPS satellite 2 has been captured. Then, the baseband processing unit 13 stores information of the captured respective GPS satellites 2 (satellite numbers or the like) in the SRAM 133.

If at least one GPS satellite 2 is captured (Y of S14), the baseband processing unit 13 demodulates the navigation message transmitted from the captured GPS satellite 2 and starts acquisition of various kinds of information contained in the navigation message (S16). Specifically, the baseband processing unit 13 respectively demodulates the navigation messages from the captured GPS satellites 2 to acquire various kinds of information such as time information and trajectory information, and stores the acquired information in the SRAM 133.

Then, if the baseband processing unit 13 has successfully acquired information of four or more GPS satellites 2 (Y of S18), the unit calculates the position of the receiving point (positioning calculation) using the trajectory information, the time information, etc. contained in the navigation messages (S20). Specifically, the baseband processing unit 13 selects four or more GPS satellites 2 among all of the captured GPS satellites 2, reads out the trajectory information and the time information of the selected GPS satellites 2 from the SRAM 133, and performs the positioning calculation. Then, the baseband processing unit 13 stores various kinds of information such as result of the positioning calculation (position information of the receiving point), the reception status, etc. in the SRAM 133.

The baseband processing unit 13 repeats the processing at steps S18 and S20 until the unit is changed to the position fix mode. In the case where the unit is changed to the position fix mode (Y of S22), if the baseband processing unit 13 has successfully acquired information of one or more GPS satellites 2 (Y of S24), the unit calculates the time of the receiving point and the propagation delay times of the satellite signals using the position information of the receiving point set by the processing unit 20 and the trajectory information, the time information, etc. contained in the navigation messages (S26). Specifically, the baseband processing unit 13 selects one or more GPS satellites 2 among all of the acquired GPS satellites 2, reads out the time information (Z-count data or the like) of the selected GPS satellites 2 from the SRAM 133, and calculates the time of the receiving point (for example, the time of the head of the next subframe). Further, the baseband processing unit 13 reads out the trajectory information of the selected GPS satellites 2 from the SRAM 133 and calculates the positions of the GPS satellites 2. Furthermore, the baseband processing unit 13 reads out the position information of the receiving point set by the processing unit 20 from the SRAM 133, calculates the distances between the GPS satellites 2 and the receiving point using the calculation results of the positions of the GPS satellites 2 and the position information of the receiving point, and calculates the propagation delay times of the satellite signals from the radio wave velocity.

Then, the baseband processing unit 13 updates the set value of the 1 PPS counter using the propagation delay times of the satellite signals (calculation result at step S26) (S28). Specifically, the 1 PPS counter is a counter that generates pulse of 1 PPS when counting to the set value, and the baseband processing unit 13 updates the set value of the 1 PPS counter so that, with respect to the reception time of the head of the next subframe, the pulse of the latest 1 PPS may be generated at the time before by the propagation delay times of the satellite signals.

Then, the baseband processing unit 13 repeats the processing of steps S24 to S28 until the unit is changed to the normal positioning mode, and, if the unit is changed to the normal positioning mode (Y of S30), the unit shifts to the processing at steps S18 and S20.

Figure 5:
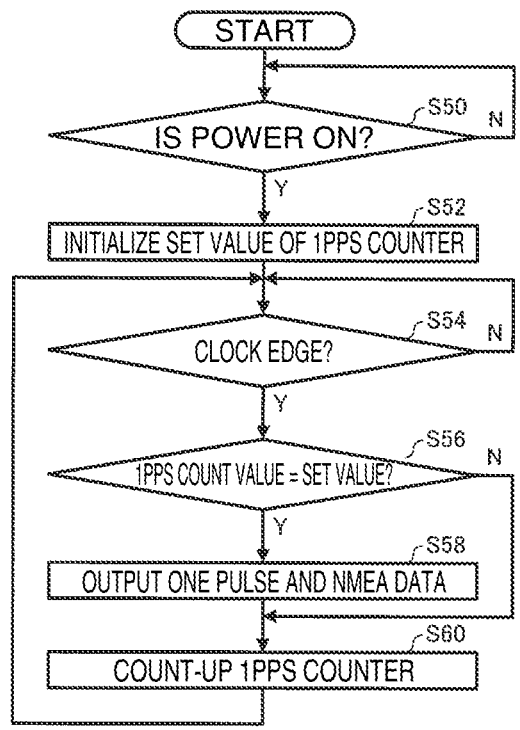
FIG. 5 is a flowchart showing an example of a processing procedure of 1 PPS output.

FIG. 5 is a flowchart showing an example of a processing procedure of 1 PPS output by the baseband processing unit of the GPS receiver 10.

As shown in FIG. 5, when the power is turned on (Y of S50), the baseband processing unit 13 initializes the set value of the 1 PPS counter (S52).

Then, if the count value of the 1 PPS counter is equal to the set value (Y of S56) at the timing of the clock edge of the 1 PPS counter (Y of S54), the baseband processing unit 13 outputs one pulse and NMEA data (S58). Specifically, the baseband processing unit 13 reads out latest various kinds of information stored in the SRAM 133, converts the information into data in an NMEA format, and outputs it. Note that the set value of the 1 PPS counter is sequentially updated at step S28 in FIG. 4.

On the other hand, if the count value of the 1 PPS counter is not equal to the set value (N of S56) at the timing of the clock edge of the 1 PPS counter, the baseband processing unit 13 does not perform processing at steps S56 and S58.

Then, the baseband processing unit 13 counts-up the 1 PPS counter (S60), and repeatedly performs processing of step S54 and the subsequent steps.

Figure 6:
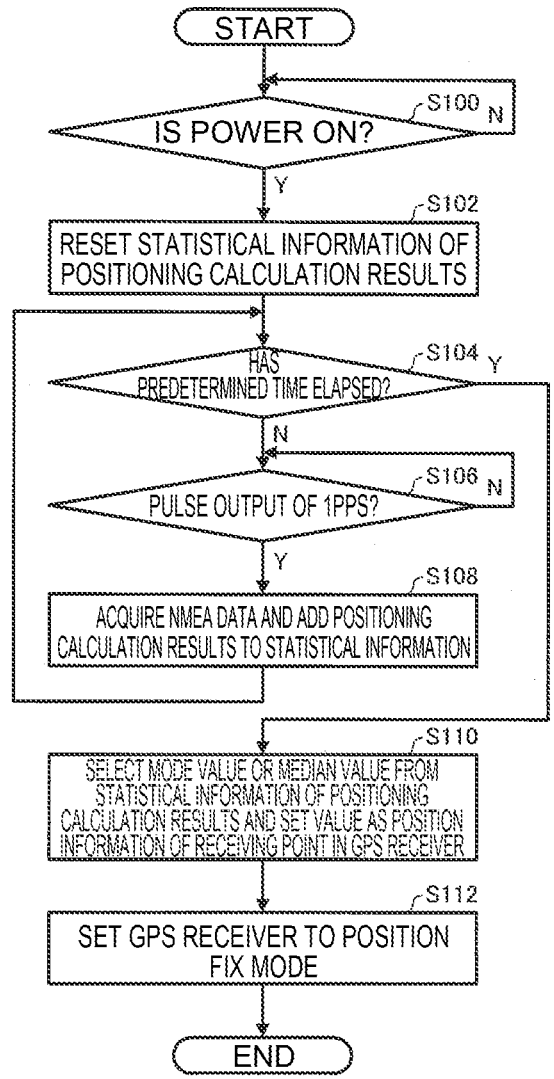
FIG. 6 is a flowchart showing an example of a processing procedure of control of the GPS receiver.

FIG. 6 is a flowchart showing an example of a processing procedure of control of the GPS receiver 10 by the processing unit 20.

As shown in FIG. 6, when the power is turned on (Y of S100), the processing unit 20 first resets statistical information of the positioning calculation results (S102).

Then, the processing unit 20 acquires the NMEA data output by the GPS receiver 10 at each time of pulse output of 1 PPS of the GPS receiver 10 (Y of S106) until a predetermined time elapses (N of S104), and adds the positioning calculation results in the normal positioning mode by the GPS receiver 10 to the statistical information (S108).

Then, if the predetermined time has elapsed (Y of S104), the processing unit 20 selects the mode value or the median value from the statistical information of the positioning calculation results, sets the value as the position information of the receiving point in the GPS receiver 10 (S110), and further sets the GPS receiver 10 to the position fix mode (S112).

Note that the precision of the position information of the receiving point is improved as the predetermined time at step S108 is longer, and thus, it is preferable to set the time of about one day (24 hours), for example.

In this manner, in the embodiment, the mode value or the median value of the statistical information of the positioning calculation results is set as the position information of the receiving point in the position fix mode in the GPS receiver 10, and experiments were made using a GPS simulator and a GPS receiver (actual equipment) for clarification of the effect by the setting of the mode value or the median value in the GPS receiver 10. In the experiments, simulations were executed with settings of the receiving position (latitude, longitude, altitude), the number of captured satellites, the strength of satellite signals in the GPS simulator, the signals output by the GPS simulator were input to the GPS receiver, the position information (latitude, longitude, altitude) output by the GPS receiver in the normal positioning mode were acquired every second, and their mean values, median values, mode values and distances between the respective values and the real position (the receiving position set in the GPS simulator) were calculated.

FIG. 7A shows experimental results under a condition that the number of acquired GPS satellites is seven or eight, the strength of satellite signals is −145 dBm, and the positioning time is 16 hours, and FIG. 7B shows experimental results under a condition that the number of acquired GPS satellites is three to five, the strength of satellite signals is −130 dBm, and the positioning time is 17 hours. The former case is on the assumption of the reception environment in which the sufficient number of GPS satellites for positioning calculation are acquired, but the strength of satellite signals is lower, and the latter case is on the assumption of the reception environment in which the strength of satellite signals is higher, but the sufficient number of GPS satellites for positioning calculation are not necessarily acquired. In both of the simulation results in FIGS. 7A and 7B, the distances from the real position were mode values, median values, mean values in order of increasing. From the simulation results, it is known that, by selection of the mode value or the median value of the position obtained by the positioning calculation and setting of the value in the GPS receiver as the position information of the receiving point in the position fix mode, the precision of 1 PPS is improved compared to the case where the mean value is selected.

As described above, according to the timing signal generating device of the first embodiment, the mode value or the median value is selected from the statistics of the results of the positioning calculation over a predetermined time in the normal positioning mode by the GPS receiver, and the mode value or the median value is set as the position information of the receiving point in the position fix mode of the GPS receiver. When the reception environment of satellite signals is deteriorated, errors of the positioning calculation due to multipath or the like become significant. If the mean value of the positioning results is set as the position information in the position fix mode as in the method of related art, it is highly likely that the errors are significant. However, the mode value or the median value is set as in the embodiment and the positioning results with significant errors hardly have an effect, and thereby, the precision of 1 PPS in the position fix mode may be improved compared to the method of related art.

Further, according to the timing signal generating device of the first embodiment, the position information to be set in the position fix mode is calculated using the positioning results in the normal positioning mode, and thereby, the receiving location is not limited and the cost may be reduced.

Furthermore, according to the timing signal generating device of the first embodiment, the clock signals output by the atomic oscillator are synthesized with accurate 1 PPS, and thereby, the clock signals with higher precision than the precision of the atomic oscillator may be generated. In addition, according to the timing signal generating device of the first embodiment, in the case where the precision of 1 PPS output by the GPS receiver is deteriorated or the GPS receiver stops output of 1 PPS, the processing of synthesizing the clock signals output by the atomic oscillator with 1 PPS is stopped and the atomic oscillator is self-oscillated, and thereby, 1 PPS at least with the frequency precision of the atomic oscillator may be output.

As described above, the timing signal generating device of the embodiment outputs 1 PPS with extremely high precision, and thereby, 1 PPS output by the timing signal generating device of the embodiment may be used as clock input signals of a time server that controls the time of a computer, for example.

1-2. Second Embodiment

Figure 8:
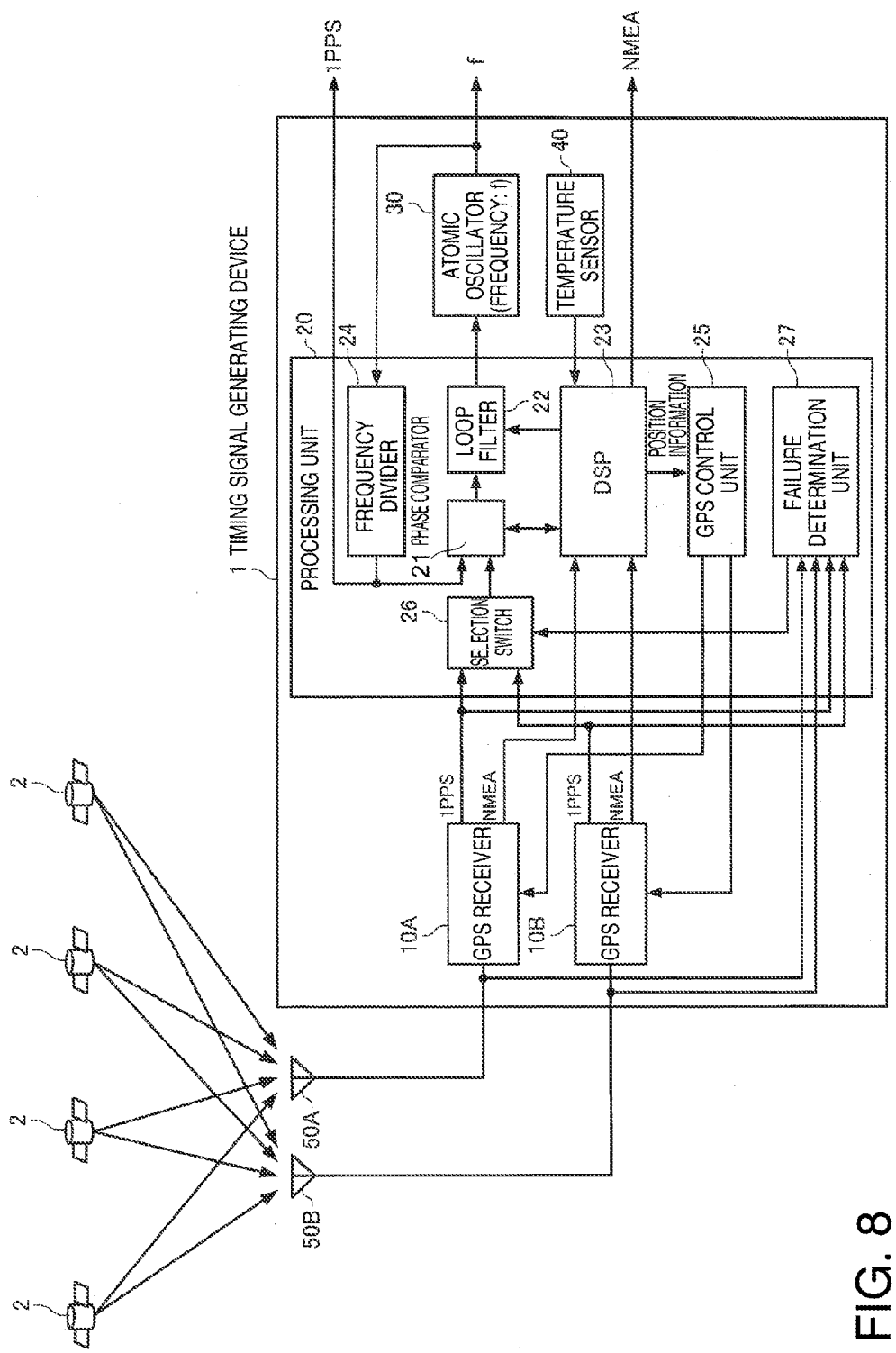
FIG. 8 shows a configuration example of a timing signal generating device of a second embodiment.

FIG. 8 shows a configuration example of a timing signal generating device of a second embodiment. As shown in FIG. 8, the timing signal generating device 1 of the second embodiment includes two GPS receivers 10A, 10B, the processing unit (CPU) 20, the atomic oscillator 30, the temperature sensor 40, and two GPS antennas 50A, 50B. Note that the timing signal generating device 1 of the embodiment may have a configuration in which part of these elements is omitted or changed or another element is added.

As shown in FIG. 8, the GPS antenna 50A is connected to the GPS receiver 10A, and the GPS receiver 10A receives satellite signals transmitted from the respective GPS satellites 2 via the GPS antenna 50A and performs various kinds of processing explained in the first embodiment. Similarly, the GPS antenna 50B is connected to the GPS receiver 10B, and the GPS receiver 10B receives the satellite signals transmitted from the respective GPS satellites 2 via the GPS antenna 50B and performs various kinds of processing explained in the first embodiment.

The two GPS antennas 50A, 50B are installed in the same location (exactly, nearly the same locations). Therefore, the two GPS receivers 10A, 10B output the same or nearly the same position information.

The processing unit 20 includes the phase comparator 21, the loop filter 22, the DSP 23, the frequency divider 24, and the GPS control unit 25 as in the first embodiment, and further includes a selection switch 26 and a failure determination unit 27.

The failure determination unit 27 performs processing of respectively determining whether or not the set of the GPS antenna 50A and the GPS receiver 10A and the set of the GPS antenna 50B and the GPS receiver 10B fail. For example, the failure determination unit 27 may detect the failure of the GPS antennas 50A, 50B by monitoring the output currents of the GPS antennas 50A, 50B, and may detect the failure of the GPS receivers 10A, 10B by monitoring the output signals (1 PPS and NMEA data) of the GPS receivers 10A, 10B.

The selection switch 26 selects and outputs one of 1 PPS output by the GPS receiver 10A and 1 PPS output by the GPS receiver 10B based on the determination results of the failure determination unit. The 1 PPS output by the selection switch 26 is input to the phase comparator 21. That is, the selection switch 26 functions as a timing signal selection unit.

The DSP 23 performs processing of respectively acquiring the NMEA data at fixed intervals (for example, every second) from the GPS receivers 10A, 10B, collecting the position information contained in the respective NMEA data (results of positioning calculation in the normal positioning mode by the GPS receivers 10A, 10B) to create two pieces of statistical information in a predetermined time, and generating the position information of two receiving points based on the respective mode values or the median values thereof. That is, the processing of generating the position information of the two receiving points may be performed using values nearer the mode values or the median values than the mean values of the statistical information.

The GPS control unit 25 transmits various control commands to the GPS receivers 10A, 10B and controls the operation of the GPS receivers 10A, 10B. In the embodiment, the GPS control unit 25 performs processing of transmitting the control commands for mode setting to the GPS receivers 10A, 10B and switching the GPS receivers 10A, 10B from the normal positioning mode to the position fix mode. Further, the GPS control unit 25 performs processing of transmitting the control commands for position setting to the GPS receivers 10A, 10B before switching the GPS receivers 10A, 10B from the normal positioning mode to the position fix mode, and respectively setting the position information of the two receiving points generated by the DSP 23 in the GPS receivers 10A, 10B.

Figure 9:
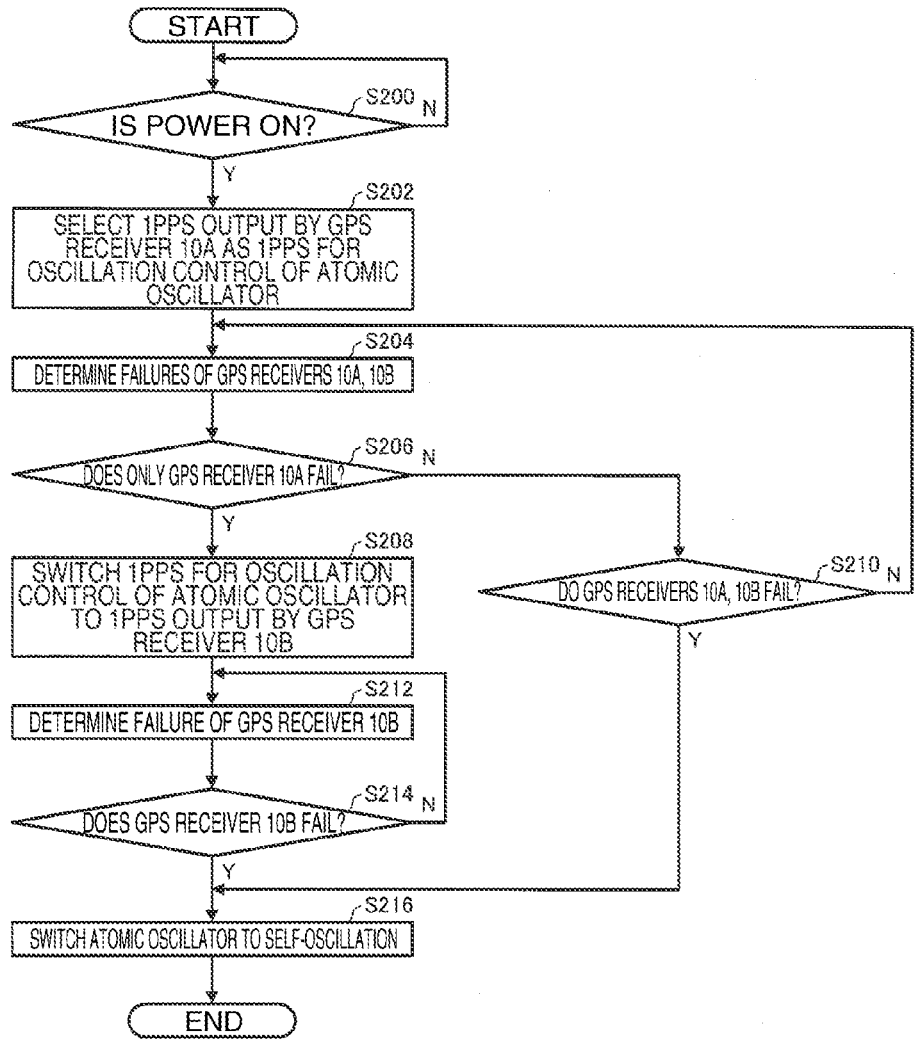
FIG. 9 is a flowchart showing an example of a processing procedure of 1 PPS selection in the second embodiment.

FIG. 9 is a flowchart showing an example of a processing procedure of 1 PPS selection by the processing unit 20.

As shown in FIG. 9, when power is turned on (Y of S200), the processing unit 20 first selects 1 PPS output by the GPS receiver 10A as 1 PPS for oscillation control of the atomic oscillator 30 (1 PPS input to the phase comparator 21) (S202).

Then, the processing unit 20 determines failures of the GPS receivers 10A, 10B (S204). If the processing unit 20 determines that only the GPS receiver 10A fails (Y of S206), the unit switches the 1 PPS for oscillation control of the atomic oscillator 30 to the 1 PPS output by the GPS receiver 10B (S208). Then, the processing unit 20 determines the failure of the GPS receiver 10B (S212).

If the processing unit 20 determines that both of the GPS receivers 10A, 10B fail in the determination processing at step S204 (N of S206 and Y of S210) or determines that the GPS receiver 10B fails in the determination processing at step S212 (Y of S214), the processing unit 20 switches the atomic oscillator 30 to self-oscillation (S216).

Note that, if one or both of the GPS receivers 10A, 10B fail, the processing unit 20 may output a failure notification signal for notification of the failure to the outside. For example, information in response to the failure notification signal is displayed on an external monitor, and thereby, a user may recognize the failure and replace the failed part.

As described above, the timing signal generating device 1 of the second embodiment allows the GPS receiver 10B to operate like the GPS receiver 10A, and, when the GPS antenna 50A or the GPS receiver 10A fails, promptly switches the 1 PPS input to the phase comparator 21 from the 1 PPS output by the GPS receiver 10A to the 1 PPS output by the GPS receiver 10B. Note that, in the embodiment, the number of sets of the GPS receiver and the GPS antenna is two, however, three or more sets may be employed.

The rest of the configuration and the operation in the timing signal generating device 1 of the second embodiment are the same as those of the first embodiment and their illustration and explanation will be omitted.

As described above, according to the timing signal generating device of the second embodiment, a plurality of GPS antennas installed in the same location and a plurality of GPS receivers that respectively process satellite signals received by the respective GPS antennas are provided, and the failure of the set of GPS antenna and GPS receiver being selected is detected and the set is switched to another set of GPS antenna and GPS receiver. Therefore, even in the case where a failure occurs in the set of GPS antenna and GPS receiver being selected, the output of high-precision 1 PPS may be continued.

In addition, the timing signal generating device of the second embodiment may exert the same effect as the effect exerted by the above described timing signal generating device of the first embodiment.

1-3. Third Embodiment

Figure 10:
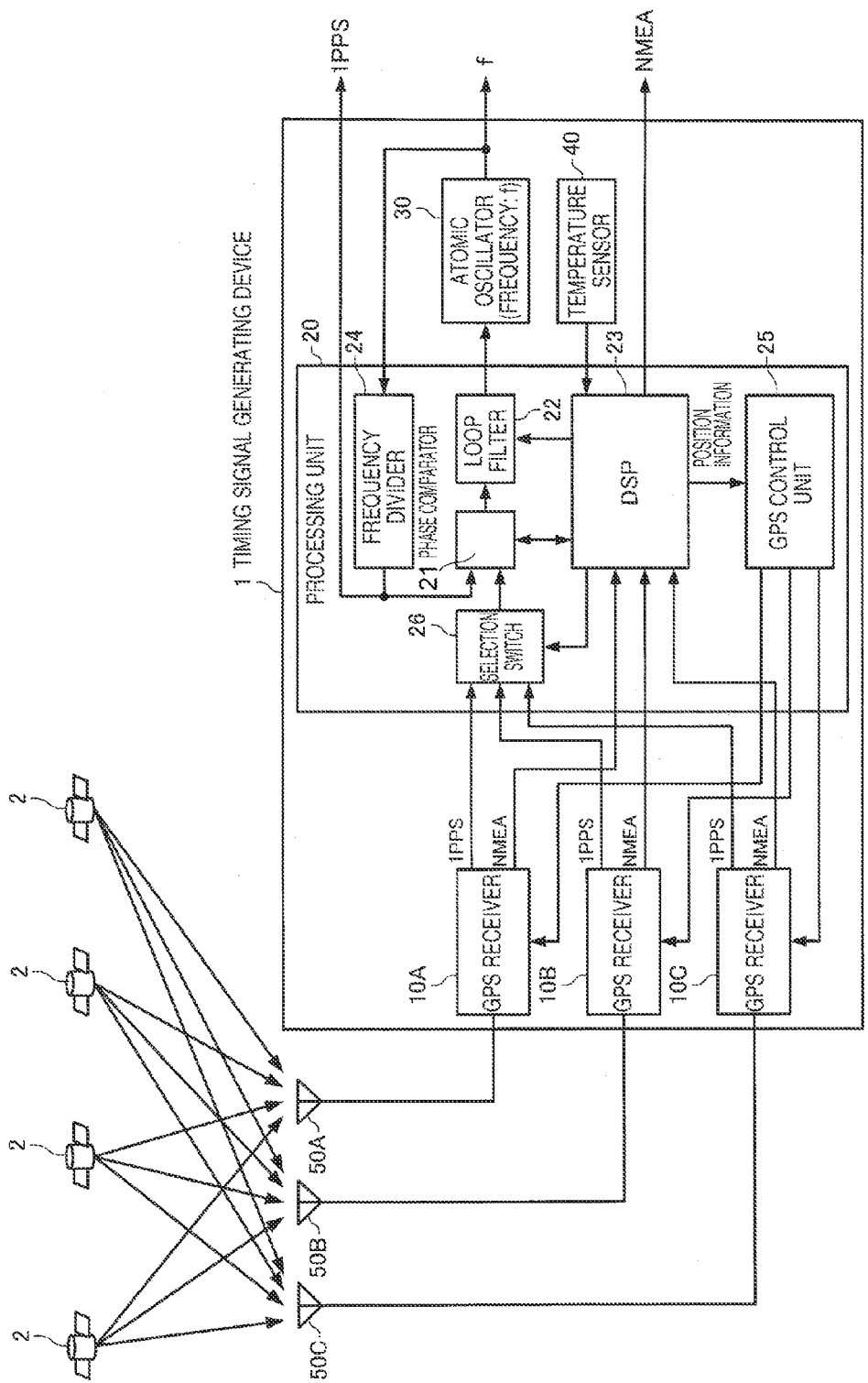
FIG. 10 shows a configuration example of a timing signal generating device of a third embodiment.

FIG. 10 shows a configuration example of a timing signal generating device of a third embodiment. As shown in FIG. 10, the timing signal generating device 1 of the third embodiment includes three GPS receivers 10A, 10B, 10C, the processing unit (CPU) 20, the atomic oscillator 30, the temperature sensor 40, and three GPS antennas 50A, 50B, 50C. Note that the timing signal generating device 1 of the embodiment may have a configuration in which part of these elements is omitted or changed or another element is added.

As shown in FIG. 10, the GPS antenna 50A is connected to the GPS receiver 10A, and the GPS receiver 10A receives satellite signals transmitted from the respective GPS satellites 2 via the GPS antenna 50A and performs various kinds of processing explained in the first embodiment. Similarly, the GPS antenna 50B is connected to the GPS receiver 10B, and the GPS receiver 10B receives the satellite signals transmitted from the respective GPS satellites 2 via the GPS antenna 50B and performs various kinds of processing explained in the first embodiment. Similarly, the GPS antenna 50C is connected to the GPS receiver 10C, and the GPS receiver 10C receives the satellite signals transmitted from the respective GPS satellites 2 via the GPS antenna 50C and performs various kinds of processing explained in the first embodiment.

Unlike the second embodiment, the three GPS antennas 50A, 50B, 50C are installed in different locations from one another. Therefore, the three GPS receivers 10A, 10B, 10C output different position information from one another. For example, when the three GPS antennas 50A, 50B, 50C are respectively installed at the north side, the south side, the east side, or the like of a building, the reception statuses of satellite signals are respectively different and the antenna that is best to receive satellite signals changes depending on the time period. Therefore, the order of precision of 1 PPS respectively output by the GPS receivers 10A, 10B, 10C also changes with the lapse of time.

The processing unit 20 includes the phase comparator 21, the loop filter 22, the DSP 23, the frequency divider 24, and the GPS control unit 25 as in the first embodiment, and further includes the selection switch 26.

The DSP 23 performs processing of respectively acquiring the NMEA data at fixed intervals (for example, every second) from the GPS receivers 10A, 10B, 10C, collecting the position information contained in the respective NMEA data (results of positioning calculation in the normal positioning mode by the GPS receivers 10A, 10B, 10C) to create three pieces of statistical information in a predetermined time, and generating the position information of three receiving points based on the respective mode values or the median values thereof. That is, the processing of generating the position information of the three receiving points may be performed using values nearer the mode values or the median values than the mean values of the statistical information.

Further, the DSP 23 compares the precision (synchronization precision with one second of UTC (coordinated universal time) of 1 PPS output by the GPS receivers 10A, 10B, 10C based on predetermined parameter information (for example, the number of acquired GPS satellites, reception strength of satellite signals, etc.) contained in the NMEA data respectively acquired from the GPS receivers 10A, 10B, 10C. For example, the DSP 23 may determine that the precision of 1 PPS is higher as the reception strengths of satellite signals are higher if the numbers of acquired GPS satellites are the same, and the precision of 1 PPS is higher as the number of acquired GPS satellites is larger if the reception strengths of satellite signals are nearly the same.

The selection switch 26 selects and outputs one of 1 PPS output by the GPS receiver 10A, 1 PPS output by the GPS receiver 10B, and 1 PPS output by the GPS receiver 10C in response to the comparison results of the DSP 23. The 1 PPS output by the selection switch 26 is input to the phase comparator 21.

Further, in the embodiment, the DSP 23 controls the selection switch 26 to select 1 PPS, and then, monitors the NMEA data output by the GPS receiver outputting the selected 1 PPS, and, if the difference from the previous data is larger than a predetermined threshold value, processing of comparing the precision of 1 PPS output by the GPS receivers 10A, 10B, 10C is performed again.

The GPS control unit 25 transmits various control commands to the GPS receivers 10A, 10B, 10C and controls the operation of the GPS receivers 10A, 10B, 10C. In the embodiment, the GPS control unit 25 performs processing of transmitting the control commands for mode setting to the GPS receivers 10A, 10B, 10C and switching the GPS receivers 10A, 10B, 10C from the normal positioning mode to the position fix mode. Further, the GPS control unit 25 performs processing of transmitting the control commands for position setting to the GPS receivers 10A, 10B, 10C before switching the GPS receivers 10A, 10B, 10C from the normal positioning mode to the position fix mode, and respectively setting the position information of the three receiving points generated by the DSP 23 in the GPS receivers 10A, 10B, 10C.

Figure 11:
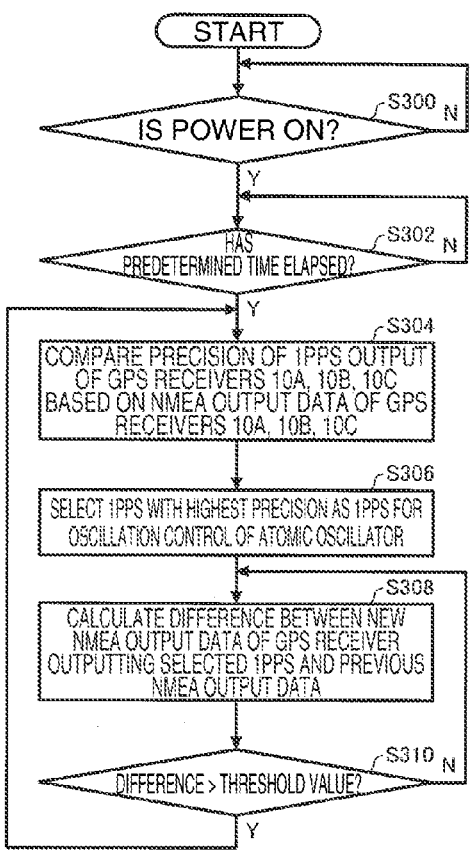
FIG. 11 is a flowchart showing an example of a processing procedure of 1 PPS selection in the third embodiment.

FIG. 11 is a flowchart showing an example of a processing procedure of 1 PPS selection by the processing unit 20.

As shown in FIG. 11, when the power is turned on (Y of S300), after a predetermined time elapses (Y of S302), the processing unit 20 first compares the precision of 1 PPS respectively output by the GPS receivers 10A, 10B, 10C based on the NMEA data respectively output by the GPS receivers 10A, 10B, 10C (S304).

Then, the processing unit 20 selects 1 PPS with the highest precision as 1 PPS for oscillation control of the atomic oscillator 30 (1 PPS input to the phase comparator 21) (S306).

Then, the processing unit 20 calculates a difference between the NMEA data newly output by the GPS receiver outputting the selected 1 PPS and the previous NMEA data (S308).

Then, the processing unit 20 repeats the processing at step S308 if the difference calculated at step 308 is equal to or less than the threshold value (N of S310), and performs the processing at step S304 and the subsequent steps again if the difference is larger than the threshold value (Y of S310).

As described above, the timing signal generating device 1 of the third embodiment allows the three GPS receivers 10A, 10B, 10C respectively connected to the three GPS antennas 50A, 50B, 50C installed in the different locations from one another to operate in the same manner, selects 1 PPS with the highest precision as 1 PPS input to the phase comparator 21, and, if deterioration of the precision of 1 PPS being selected is determined, reselects 1 PPS with the highest precision. Note that, in the embodiment, the number of sets of the GPS receiver and the GPS antenna is three, however, two, four, or more sets may be employed.

The rest of the configuration and the operation in the timing signal generating device 1 of the third embodiment are the same as those of the first embodiment and their illustration and explanation will be omitted.

As described above, according to the timing signal generating device of the third embodiment, a plurality of GPS antennas installed in the different locations from one another and a plurality of GPS receivers that respectively process satellite signals received by the respective GPS antennas are provided, and 1 PPS with the highest precision is selected among a plurality of 1 PSS output by the plurality of GPS receivers and output. Therefore, even in the case where the reception environment including the reception strength, the number of visible satellites, and the multipath changes in response to the lapse of time, the output of high-precision 1 PPS may be continued.

In addition, the timing signal generating device of the third embodiment may exert the same effect as the effect exerted by the above described timing signal generating device of the first embodiment.

2. Electronic Apparatus

Figure 12:
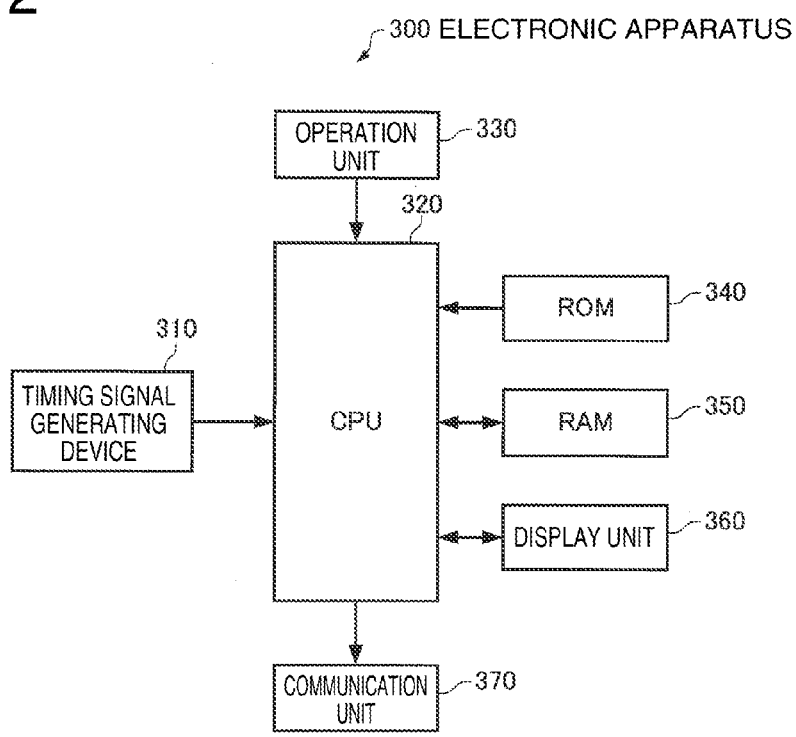
FIG. 12 is a functional block diagram of an electronic apparatus of the embodiment.

FIG. 12 is a functional block diagram of an electronic apparatus of the embodiment.

An electronic apparatus 300 of the embodiment includes a timing signal generating device 310, a CPU (Central Processing Unit) 320, an operation unit 330, a ROM (Read Only Memory) 340, a RAM (Random Access Memory) 350, a communication unit 360, and a display unit 370. Note that the electronic apparatus of the embodiment may have a configuration in which part of the component elements (respective parts) in FIG. 12 is omitted or changed or another component element is added.

The timing signal generating device 310 is the timing signal generating device 1 of the above described first embodiment to the third embodiment, for example, and, as described above, receives satellite signals, generates high-precision timing signals (1 PPS), and outputs the signals to the outside.

The CPU 320 performs various kinds of calculation processing and control processing according to the programs stored in the ROM 340 etc. Specifically, the CPU 320 performs timing processing, various kinds of processing in response to the operation signals from the operation unit 330, processing of controlling the communication unit 360 for data communication with the outside, processing of transmitting display signals for the display unit 370 to display various kinds of information, etc. in synchronization with the timing signals (1 PPS) and clock signals output by the timing signal generating device 310.

The operation unit 330 is an input device including operation keys, button switches, etc., and outputs operation signals in response to the operation by the user to the CPU 320.

The ROM 340 stores programs, data, etc. for the CPU 320 to perform various kinds of calculation processing and control processing.

The RAM 350 is used as a work area of the CPU 320 and temporarily stores programs and data read out from the ROM 340, data input from the operation unit 330, calculation results executed by the CPU 320 according to various kinds of programs, etc.

The communication unit 360 performs various kinds of control for establishment of data communication between the CPU 320 and an external device.

The display unit 370 is a display device having an LCD (Liquid Crystal Display) etc. and displays various kinds of information based on the display signals input from the CPU 320. In the display unit 370, a touch panel that functions as the operation unit 330 may be provided.

The timing signal generating device 1 of the embodiment is incorporated as the timing signal generating device 310, and thereby, an electronic apparatus with higher reliability may be realized at lower cost.

Various kinds of electronic apparatuses are conceivable as the electronic apparatus 300, including, for example, a server for time control that realizes synchronization with the standard time (time server), a time control device that performs issuance of time stamps or the like (time stamp server), a frequency reference system such as a base station, etc.

3. Moving Object

Figure 13:
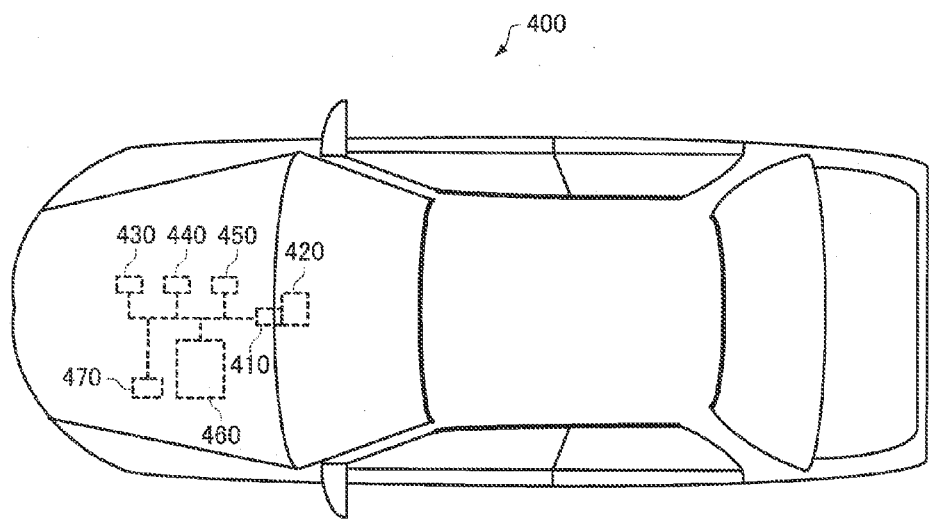
FIG. 13 shows an example of a moving object of the embodiment.

FIG. 13 shows an example of a moving object of the embodiment (top view). A moving object 400 shown in FIG. 13 includes a timing signal generating device 410, a car navigation system 420, controllers 430, 440, 450, a battery 460, and a backup battery 470. Note that the moving object of the embodiment may have a configuration in which part of the component elements (respective parts) in FIG. 13 is omitted or changed or another component element is added.

As the timing signal generating device 410, the timing signal generating device 1 of the above described respective embodiments may be applied. For example, when the moving object 400 is moving, the timing signal generating device 410 performs positioning calculation in real time in the normal positioning mode and outputs 1 PPS, clock signals, and NMEA data. Further, for example, during halt of the moving object 400, the timing signal generating device 410 performs positioning calculation at a plurality of times in the normal positioning mode, and then, sets the mode value or the median value of the plural positioning calculation results as current position information, and outputs 1 PPS, clock signals, and NMEA data in the position fix mode.

The car navigation system 420 displays, on the display, the position, the time, and other various kinds of information using the NMEA data output by the timing signal generating device 410 in synchronization with the 1 PPS and the clock signals output by the timing signal generating device 410.

The controllers 430, 440, 450 perform various kinds of control of an engine system, a brake system, a keyless entry system, etc. The controllers 430, 440, 450 may perform various kinds of control in synchronization with the clock signals output by the timing signal generating device 410.

The moving object 400 of the embodiment includes the timing signal generating device 410, and thereby, may secure high reliability both during movement and halt.

As the moving object 400, various moving objects are conceivable, including, for example, automobiles (including electric automobiles), aircraft such as a jet plane and a helicopter, ships, rockets, artificial satellites, etc.

4. Modified Examples

The invention is not limited to the embodiments, but various modifications may be made within the scope of the invention.

For example, in the above described respective embodiments, the timing signal generating device including the atomic oscillator has been taken as examples, however, the atomic oscillator may be replaced by another oscillator such as a crystal oscillator or an MEMS (Micro Electro Mechanical Systems) oscillator.

Further, for example, in the timing signal generating device of the above described third embodiment, backup sets may be respectively provided for the respective sets of GPS antenna and GPS receiver as in the second embodiment.

Furthermore, in the above described respective embodiments, the timing signal generating device using GPS has been taken as examples, however, another global navigation satellite system (GNSS) than GPS, for example, Galileo, GLONASS, or the like may be used.

The above described embodiments and modified examples are just examples, and not limited. For example, the respective embodiments and the modified examples may be appropriately combined.

The invention includes substantially the same configurations (for example, the configurations having the same functions, methods, and results, or the configurations having the same purposes and effects) as the configurations explained in the embodiments. Further, the invention includes the configurations in which non-essential parts of the configurations explained in the embodiments are replaced. Furthermore, the invention includes the configurations that may exert the same effects or the configurations that may achieve the same purposes as those of the configurations explained in the embodiments. In addition, the invention includes the configurations in which known technologies are added to the configurations explained in the embodiments.

The entire disclosure of Japanese Patent Application No. 2013-006994, filed Jan. 18, 2013 is expressly incorporated by reference herein.

What is claimed is:

1. A timing signal generating device comprising: a receiver configured to:
    receive satellite signals transmitted from position information satellites; and
    obtain position calculation results by calculating positions repetitively based on trajectory information and time information obtained from the received satellite signals, wherein the calculated positions include latitude and longitude values; and
a processor configured to:
    receive the position calculation results from the receiver;
    calculate a mode value or a median value of the position calculation results obtained by the receiver, wherein the calculated mode value or median value corresponds to a mode or median of the latitude and longitude values;
    generate position information for the device by determining a position using the calculated mode value or median value of the position calculation results, wherein the generated position information includes generated latitude and longitude values;
wherein the receiver is further configured to:
    receive the position information for the device generated by the processor;
    generate timing signals in synchronization with a reference time based on the position information generated by the processor;
    obtain the position calculation results in a first mode; and
    generate the timing signals in a second mode; and
wherein the processor is configured to transmit a command to the receiver; and the receiver is configured to be set to one of the first mode and the second mode based on the command; and wherein the receiver further comprises a memory;

wherein the processor is configured to write the position information in the memory and transmit the command to set the receiver to the second mode; and the receiver is configured to generate the timing signals based on the position information in the memory.

2. The device according to claim 1, wherein the receiver further comprises a memory;

wherein the processor is configured to write the position information in the memory; and the receiver is configured to generate the timing signals based on the position information in the memory.

3. The device according to claim 1, further comprising: a second receiver configured to:

receive the position information of the device; and generate second timing signals in synchronization with the reference time based on the position information, wherein the processor is configured to:

determine whether there is a failure of the receiver or the second receiver; and select the timing signals generated by one of the receiver and the second receiver based on results of the determination.

4. The device according to claim 1, further comprising a second receiver, wherein the receiver is configured to obtain the position calculation results using the satellite signals as received by a first antenna; and wherein the second receiver is configured to obtain second position calculation results using second satellite signals received by a second antenna at a different location than the first antenna.

5. The device according to claim 4, wherein the processor is configured to:

receive the second position calculation results from the second receiver;

calculate a second mode value or a second median value of the second position calculation results; and generate the second position information of the device by determining a position based on the second mode value or the second median value.

6. The device according to claim 5, wherein the receiver is configured to generate parameter information representing reception status of the satellite signals as received by the first antenna, and the second receiver is configured to generate second parameter information representing reception status of the satellite signals as received by the second antenna.

7. The device according to claim 5, wherein the processor is configured to:

compare respective precisions of the timing signals and the second timing signals based on the parameter information and the second parameter information; and select one of the timing signals and the second timing signals based on results of the comparison.

8. The device according to claim 1, further comprising:

an oscillator that outputs clock signals, wherein the processor is configured to synchronize the clock signals with the timing signals.

* * * * *